United States Patent

Boos et al.

[15] 3,648,126

[45] Mar. 7, 1972

[54] ELECTRICAL CAPACITOR EMPLOYING PASTE ELECTRODES

[72] Inventors: Donald L. Boos, Garfield Heights; Joseph E. Metcalfe, III, Bedford, both of Ohio

[73] Assignee: The Standard Oil Company, Cleveland, Ohio

[22] Filed: Dec. 28, 1970

[21] Appl. No.: 101,834

[52] U.S. Cl. ............................................... 317/230, 29/570
[51] Int. Cl. ............................................................ H01g 9/04
[58] Field of Search .......................... 317/230, 231, 233, 262

[56] References Cited

UNITED STATES PATENTS

| | | | |
|---|---|---|---|
| 2,800,616 | 7/1957 | Becker | 317/230 |
| 3,105,178 | 9/1963 | Meyers | 317/262 |
| 3,288,641 | 11/1966 | Rightmire | 317/231 X |
| 3,536,963 | 10/1970 | Boos | 317/230 |

*Primary Examiner*—James D. Kallam
*Attorney*—John F. Jones and Sherman J. Kemmer

[57] ABSTRACT

A high capacitance low voltage electrolytic capacitor consists essentially of a pair of paste electrodes and a separator saturated with electrolyte which functions as an electronic insulator and an ionic conductor. One of said paste electrodes is composed of active carbon and the opposing paste electrode is composed of a powdered metal selected from the group consisting of copper, nickel, cadmium, zinc, iron, manganese, lead, magnesium, titanium, silver, cobalt, indium, selenium and tellurium, said electrodes being prepared by mixing finely divided particulate material of the above electrode materials with electrolyte to form a viscous paste and compressing the paste to form the electrodes.

10 Claims, 3 Drawing Figures

Patented March 7, 1972

3,648,126

INVENTOR.
DONALD L. BOOS
JOSEPH E. METCALFE, III
BY
John F. Jones
ATTORNEY

ELECTRICAL CAPACITOR EMPLOYING PASTE ELECTRODES

The present invention relates to an electrical energy storage device and more particularly to a miniaturized high capacitance, low voltage electrical capacitor. The electrical capacitor of this invention comprises a pair of paste electrodes, a separator which functions as an electronic insulator and an ionic conductor, and an electrolyte disposed within the pores of the separator.

The novel feature of the capacitor described herein resides in the paste electrode structures. The paste electrodes comprise a carbon electrode and an opposing reactive metal electrode selected from the group consisting of copper, nickel, cadmium, zinc, iron, manganese, lead, magnesium, titanium, silver, cobalt, indium, selenium, and tellurium. In accordance with this invention the electrodes are manufactured by mixing finely divided particulate material of carbon or of the metal with an electrolyte to form a paste, and subsequently compressing the paste to form the electrodes.

The paste electrode capacitor of this invention has a very high capacity for a given volume while still maintaining capacitor discharge characteristics. The capacitor of this invention is essentially a combination of two capacitors, a reaction capacitor and a double-layer capacitor. The carbon electrode capacitor utilizes the high surface area double-layer to store energy while the metal electrode capacitor utilizes chemical energy. The double-layer capacitor is in series with the reaction capacitor, and the cell capacity for a given size carbon electrode is virtually doubled. This results in a capacitive charge and discharge characteristic with a much higher capacity per cubic inch. Therefor, the capacitor of this invention is useful as a replacement for conventional electrical capacitors and applications where an extremely high capacitance and very low equivalent series resistance is required. The equivalent series resistance in this type of capacitor consists of the sum of the electronic resistances in the electrodes and the ionic resistance of the electrolyte. The capacitors described herein may have application in devices when employed in parallel with a battery to produce a high pulse power output such as pulse radio transmission, pulse telemetry transmission, a key light for automobiles, as DC power sources in flasher signals, lighted buoys, cordless appliances and related products.

The paste electrode capacitor herein described possesses several important advantages over the capacitors disclosed in the prior art. Since the electron conductor is divided and separated by a nonelectron-conducting separator, electrical charges are stored at the boundary between the electron-conducting and nonelectron-conducting portion of the circuit. The carbon electrode develops its capacity by building up a charge at the electrode/electrolyte interface, and the greater this interface area the greater the capacity. In the instant invention the electrode/electrolyte interface area is maximized without increasing the overall physical size of the capacitor by providing a highly porous carbon electrode which forms extensive boundary surfaces on exposure to the electrolyte. Accordingly, in a preferred embodiment of this invention, the highly porous carbon electrode is in the form of a thin plate formed from activated carbon having a surface area in the range of from 100 to 2,000 meters$^2$/cc., and preferably in the range of 500–1,500 meters$^2$/cc. as determined by the conventional Brunauer, Emmett And Teller method. Although it is also desirable for the opposing metal electrode to have a high surface area, it is not so critical since the metal electrode derives its capacitance from chemical energy.

In addition to high capacitance as a result of the use of the combination of a reaction electrode and a double-layer highly porous electrode, other advantages associated with the capacitor of the present invention are that the paste electrodes are sufficiently flexible to resist cracking and breaking and thereby can be manufactured in minimum dimensions. Whereas the minimum thickness of the prior art electrodes is limited by the fragile nature of the material, the thickness of the paste electrode is not so limited.

The paste electrode can be deposited on a support surface as a very thin film by known techniques, such as silk screening, spraying, or roll coating. Since electronic resistance is directly proportional to the thickness of an electrode, reducing the thickness produces a corresponding reduction in electronic resistance as well as reduction of the re-equilibration charge on interruption of the discharge current.

The invention will be more readily understood from the following detailed description taken in conjunction with the drawing wherein:

FIG. 1 represents a single-cell electrical capacitor consisting of a pair of electrode assemblies 10 and 11. Each electrode subassembly consists of an electronic-conducting and ionic insulating member 12 which can be made of, for example, carbon, lead, iron, nickel, or any of the conducting alloys. Member 12 is characterized by its electrical conducting property and its chemical inertness to the particular electrolyte employed at the potential impressed upon it. Its primary functions are as a current collector and an intercell ionic insulator. If the particular electronic-conducting and ionic insulating member is susceptible to corrosion by the electrolyte or is not completely impervious thus permitting the electrolyte to seep through and corrode adjoining components, the surfaces of the member can be provided with a coating of a noble metal or a substance such as colloidal graphite in a solvent such as alcohol, to minimize such problems. This procedure is also effective in reducing leakage currents by better than a factor of 10.

An annular means or a gasket 15 is preferably cemented or in some manner affixed to conducting member 12. Since the carbon paste electrode 13 and the metal paste electrode 14 are not rigid masses but are to some extent flexible, the principal function of gasket 15 is to confine electrodes 13 and 14 and prevent the mass of the electrode material from seeping out. The gasket is preferably constructed from an insulating material although it need not necessarily be limited to this type of material. The gasket material should be flexible to accommodate expansion and contraction of the electrode. Other obvious ways of confining the electrode should be apparent to those skilled in the art.

Separator 16 is generally made of a highly porous material which functions as an electronic-insulator between the electrodes yet allows free and unobstructed movement to the ions in the electrolyte. The pores of the separator 16 must be small enough to prevent contact between the opposing electrodes, since such a condition would result in a short circuit and consequent rapid depletion of the charges accumulated on the electrodes. The separator can also be a nonporous ion-conducting film, such as an ion-exchange membrane. Any conventional battery separator should be suitable for this purpose, and materials such as porous polyvinyl chloride, glass fiber filter paper, (Watman G.F.A.), cellulose acetate, mixed esters of cellulose, and fiber glass cloth have been found to be useful. Prior to its use, it is advantageous to saturate the separator with electrolyte. This can be accomplished by soaking the separator in the electrolyte for a period of time of up to about 15 minutes. A surfactant, such as a photographic wetting agent (Kodak's Photo-Flo solution), may be added to the electrolyte for the purpose of facilitating wetting of the separator and the electrodes. Photo-Flo solution seems to be effective only with neutral electrolytes. However, other surfactants can be used in acidic or basic electrolytes.

The carbon electrode 13 consists of activated carbon particles in admixture with the electrolyte. Activation of carbon is the process by which adsorption properties and surface area are imparted to a naturally occurring carbonaceous material. Because electrical energy storage of a capacitor is apparently based on surface area, an increase in energy storage can be expected from an increase in surface area, as by activation.

The surface area of the carbon is mainly internal and may be generated by numerous activation methods. In general, active carbon contains 80 percent or more of carbon, as well as hydrogen, nitrogen, oxygen, sulfur and inorganic salts that leave an ash on combustion. The pores in the activated carbon material must be sufficiently large to permit electrolyte penetration.

Active carbon may be prepared by initially carbonizing or charring the carbon in the absence of air below about 600° C. Any carbon-containing substance can be charred. The charred carbon is then activated usually by controlled oxidation with a suitable oxidizing gas at elevated temperatures. Most of the present commercial processes involve steam or carbon dioxide activation between 800° and 1,000° C., or air oxidation between 300° and 600° C., for a period of 30 minutes to 24 hours, depending on the oxidizing conditions and the quality of active carbon desired. Other activation methods include activation with metallic chlorides and electrochemical activation. The latter is a process whereby capacity of an electrode can be increased by electrochemical cycling.

Activated carbon made from hard and dense material, is usually carbonized, crushed to size, and activated directly to give hard and dense granules of carbon. In other cases, it is advantageous to grind the charcoal, coal, or coke to a powder, form it into briquettes or pellets with a tar or pitch binder, crush to size, calcine to 500°–700° C., and then activate with steam or flue gas at 850°–950° C. The latter procedure results in particles having a tailored structure which are more easily activated because they possess more entry channels or macropores for the oxidizing gases to enter and for the reaction products to leave the center of the particles.

The opposing electrode 14 consists of a finely divided powdered metal selected from the group consisting of copper, nickel, cadmium, zinc, iron, manganese, lead, magnesium, titanium, silver, cobalt, indium, selenium, and tellurium, in admixture with an electrolyte. The powdered metal in admixture with the electrolyte preferredly has a particle size of less than 10 microns.

In preparing the paste electrodes for use in the capacitor described herein, activated carbon or the metal powder is mixed with an electrolyte to form a thick slurry. The finely divided carbon or metal should be employed in a ratio of about 1 to 3 parts of powdered material to about 3 to 1 parts of the electrolyte by weight. The use of coarse particles should be avoided so that the jagged feature of the coarse material does not penetrate the separator and establish contact between the opposing electrodes, thus causing a short. Water or other diluents may be used to facilitate preparation of the slurry. The excess water or diluent is extracted from the slurry by conventional means, leaving a viscous paste which may be compressed into an electrode pellet by applying a predetermined amount of pressure. Upon application of pressure, some liquid will generally exude from the paste.

The electrolyte should consist of a highly conductive medium that is compatible with and is noncorrosive to the electrodes. The electrolyte may comprise an aqueous solution of a salt or a base such as for example, ammonium chloride, sodium chloride, calcium chloride, potassium bromide, potassium carbonate, sodium hydroxide, potassium hydroxide, etc.

Nonaqueous electrolytes may also be used. Solutions of metal salts of organic and inorganic acids, ammonium and quaternary ammonium salts, etc., in organic solvents such as sulfonates as in tetraethyl ammonium p-toluene sulfonate; organic nitriles as acetonitrile, propionitrile; sulfoxides such as dimethyl-, diethyl-, ethyl methyl-, and benzylmethyl sulfoxides; amides such as dimethyl formamide; pyrrolidones such as N-methylpyrrolidone; and carbonates such as propylene carbonate. Other suitable nonaqueous electrolytes are disclosed in the Proceedings of Nineteenth and Twentieth Annual Power Sources Conference publications.

The electrolyte in the electrode structure has three functions: (1) as a promoter of ion conductivity, (2) as a source of ions, and (3) as a binder for the solid particles of the electrodes. Sufficient electrolyte should be employed to accommodate these functions. A separate binder can be employed to perform binding function of the electrolyte; however, the binder would undesirably add an element of resistance.

The pressure applied in forming the electrodes is dependent on many variables such as dimensions of the electrode, particle size of the powdered material, particular electrolyte used, etc. The amount of pressure used should be within a range that will leave an amount of electrolyte within the electrode structure sufficient to accomplish the three functions referred to earlier.

In the assembly of the capacitor a pair of electrodes thus produced by the method heretofor described are placed within a separate annular gasket member 15 which is affixed to a circular current collector plate 12. A separator membrane saturated with the electrolyte is interposed between the two electrodes and this capacitor cell is disposed on a lower platen of a press. The upper platen is brought down upon the cell until the surfaces make contact and a concentric ring is slipped over the cell. At this point, the capacitor cell is confined by the upper platen, the lower platen, and the concentric ring. The cell is then compressed at a pressure sufficient to render the cell a coherent structure. Pressure of the order of about 240 p.s.i. has been found sufficient. Other methods known to those skilled in the art may be utilized to produce a coherent structure.

Figure 1:
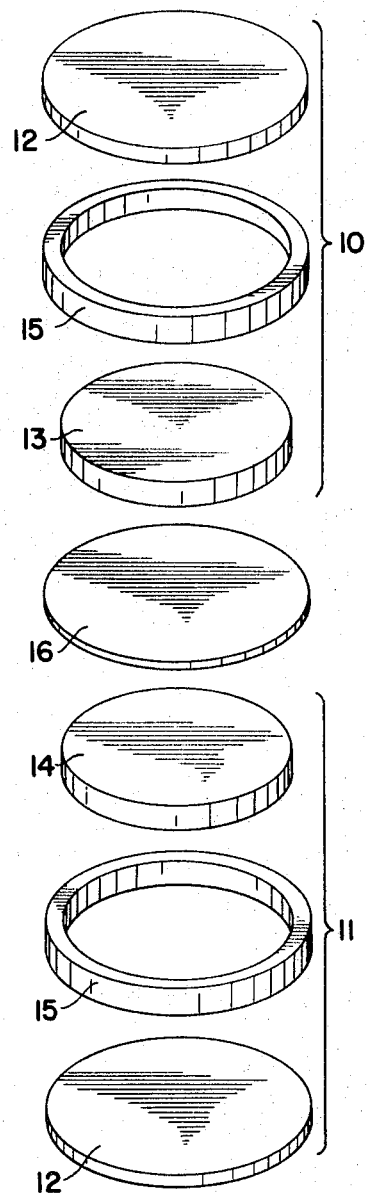
Figure 2:
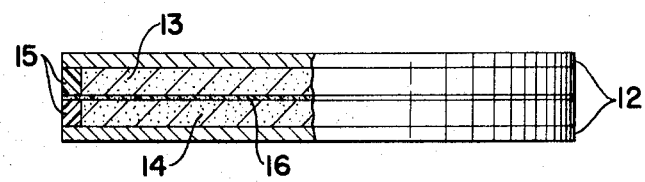
FIG. 2 shows an assembled capacitor cell. Identical reference numerals to those used in FIG. 1 denote corresponding components of the cell.
Figure 3:
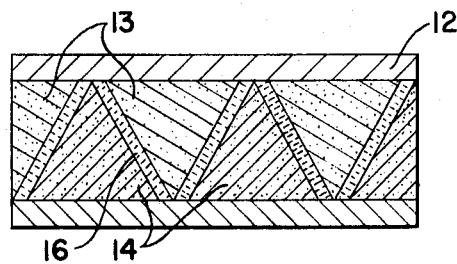
FIG. 3 illustrates another embodiment of the capacitor which utilizes elongated paste electrodes which are triangular in cross section. The same reference numerals, as in FIG. 1, are used to denote corresponding parts.

A multicell capacitor may be constructed from stacked unit cells or with a series of double electrodes capped with single electrodes on each end.

EXAMPLE I

A carbon paste electrode was prepared by mixing a sufficient amount of an aqueous solution of 25 percent by weight of KOH with activated carbon particles to form a slurry. The carbon *(*Activated carbon obtained from West Virginia Pulp and Paper Company) particles had the following specifications:

| | |
|---|---|
| Color | black |
| Odor | none |
| Taste | none |
| Fineness: | |
| thru 100 mesh | 91–99 |
| thru 200 mesh | 70–90 |
| thru 325 mesh | 50–75 |
| Density, lb./cu. ft. | 15–17 |
| Surface Area, B.E.T. (m.$^2$/g.) | 700–950 |
| Pore Volume (cc./g.) | 0.8 |
| Iodine Value | 90–96 |
| Water Solubles | 3% maximum |
| Total Ash | 6% maximum |
| Moisture | 3% maximum when packed |
| Typical Pore Area Distribution: | |
| 20 A. | 512 |
| 20–30 A. | 115 |
| 30–40 A. | 77 |
| 40–50 A. | 36 |
| 50–60 A. | 9.0 |
| 60–80 A. | 7.5 |
| 80–100 A. | 1.9 |
| 100–120 A. | 5.4 |

A paste was obtained by partially drying the slurry to remove water and removing the excess electrolyte by filtration. 0.14 gram of the paste was placed in a die and compressed under a ram force pressure of 400 p.s.i., and 20 ml. of electrolyte were added after pressing.

The opposing electrode was prepared by mixing copper powder having a particle size of <10 microns with a sufficient amount of 25 weight percent aqueous potassium hydroxide to form a slurry, and then vacuum filtering the slurry to remove the excess electrolyte. The remaining copper powder-electrolyte mixture had the consistency of a paste and was applied directly into the cavity formed by a gasket and the impervious separator.

The gasket was stamped from a sheet of a fluoroelastomer prepared from a copolymer of vinylidene fluoride and hexafluoropropylene, Sp. gr. 1.72–1.86 (DuPont's Viton) and cemented by means of an adhesive (Duro Contact) to a circular sheet or disk of a flexible vinyl film having incorporated therein carbon black to obtain maximum electrical conductivity and having the properties: Break strength (Mach. Dir.) 20 pounds, (Cross Mach. Dir.) 20 pounds; Elongation 85 percent; Specific resistance 1.5 ohms (Condulon CV5R100 obtained from The Plastic Film Co. Plainfield, Conn.). The gasket had a thickness of 0.015 inch, an I.D. of 0.75 inch, and an O.D. of 1.125 inch. The disk of vinyl film functioned as an electronic conductor and an ionic insulator and had a thickness of 0.003 inch and a diameter of 1.125 inch.

A polyester separator (L20318B, Pellon Corp.) was soaked in 25 weight percent potassium hydroxide for 15 minutes and interposed between the pair of electrode assemblies to form a cell. The separator had a thickness of 0.05 inch and a diameter of 1.00 inch and served to electronically insulate the opposing electrodes.

The assembled cell was then placed between two metal cylinders of a clamp and held in position by means of 1.25 inch (I.D.) phenolic retaining ring slipped over the capacitor assembly. The bolts of the clamp were tightened to compress the capacitor assembly under a pressure of 480 p.s.i., sufficient to render the cell a compact unit. The capacity of the cell was then determined while the cell remained in the clamp, and the following results were obtained on applying a 1-volt charge to the capacitor:

| | |
|---|---|
| Capacity | 9.9 f. |
| Resistance | 244 milliohms |
| Leakage current | 7.7 milliamps |
| Volume of carbon electrode | 0.016 inch$^3$ |

EXAMPLE II

The capacitor was constructed as in Example I except that the opposing electrode consisted of nickel metal paste instead of copper. At a 1-volt charge, the capacitor had the following characteristics:

| | |
|---|---|
| Capacity | 0.35 f. |
| Resistance | 340 milliohms |
| Leakage current | 11 milliamps |
| Volume of carbon electrode | 0.016 inch$^3$ |

EXAMPLE III

The capacitor was constructed as in Example I except that the opposing electrode consisted of a cadmium metal paste instead of copper:

| | |
|---|---|
| Capacity | 3.98 f. |
| Resistance | 560 milliohms |
| Leakage current | 0.8 milliamps |
| Volume of carbon electrode | 0.016 inch$^3$ |

EXAMPLE IV

The capacitor was constructed as in Example I except that the opposing electrode consisted of a zinc metal paste instead of copper:

| | |
|---|---|
| Capacity | 8.9 f. |
| Resistance | 460 milliohms |
| Leakage Current | 23 milliamps |
| Volume of carbon electrode | 0.016 inch$^3$ |

EXAMPLE V

The capacitor was constructed as in Example I except that the opposing electrode consisted of an iron metal paste instead of copper:

| | |
|---|---|
| Capacity | 4.1 f. |
| Resistance | 198 milliohms |
| Leakage current | 2.8 milliamps |
| Volume of carbon electrode | 0.016 inch$^3$ |

EXAMPLE VI

The capacitor was constructed as in Example IV except that the electrolyte consisted of an aqueous solution of 0.2 N potassium hydroxide-potassium bromide instead of potassium hydroxide:

| | |
|---|---|
| Capacity | 6 f. |
| Resistance | — |
| Leakage Current | 0 milliamps |
| Volume of carbon electrode | 0.016 inch$^3$ |

We claim:

1. An electrical capacitor comprising a housing, at least one pair of paste electrodes in said housing, one of each pair of said paste electrodes being composed of a mixture of carbon and an electrolyte and the other paste electrode being composed of a mixture of a powdered metal selected from the group consisting of copper, nickel, cadmium, zinc, iron, manganese, lead, magnesium, titanium, silver, cobalt, indium, selenium, and tellurium, in admixture with the electrolyte, and an ionically conductive separator means between and in contact with said pair of electrodes, electronically separating said electrodes from each other.

2. Capacitor of claim 1 wherein said carbon paste electrode comprises activated carbon material having a surface area in the range of 100–2,000 meters$^2$/g., in admixture with said electrolyte.

3. Capacitor of claim 1 wherein said separator is a porous separator saturated with an electrolyte.

4. Capacitor of claim 3 wherein said saturated porous separator includes a wetting agent facilitating saturation of said separator with said electrolyte.

5. Capacitor of claim 1 including an electrically conducting member on the surface of each of said electrodes facing away from the separator-contact surface, said member functioning as a current collector and as an impervious barrier to the passage of said electrolyte.

6. Capacitor of claim 5 including an annular insulating flexible means for confining the periphery of said electrodes held captive by said member.

7. The capacitor of claim 6 wherein the capacitor assembly of the component parts is compressed under a pressure of at least 240 p.s.i. to render said capacitor a compact unit.

8. An electrical capacitor comprising a plurality of cells connected in series, each cell consisting essentially of a pair of paste electrodes, an ionically conducting separator means interposed between and electronically separating said electrodes, and a conducting member functioning as a current collector and as an impervious barrier to the passage of said electrolyte disposed between said cells, one of said paste electrodes containing activated carbon material having a surface area in the range of 100–2,000 meters$^2$/g. and the other paste electrode being composed of a powdered metal selected from the group consisting of copper, nickel, cadmium, zinc, iron, manganese, lead, magnesium, titanium, silver, cobalt, indium, selenium, and tellurium, said electrode materials being in admixture with an electrolyte in an amount sufficient to impart to said mixture a consistency of a viscous paste.

9. Capacitor of claim 8 wherein said separator is saturated with the electrolyte and said activated carbon material has a surface area in the range of 500–1,500 meters$^2$/g.

10. Capacitor of claim 9 including an insulating flexible annular means held captive by said members for confining periphery of said electrodes.

* * * * *